Feb. 4, 1964 L. A. KREIDER 3,120,143
TUBE NOTCHING MACHINE
Filed Feb. 20, 1961
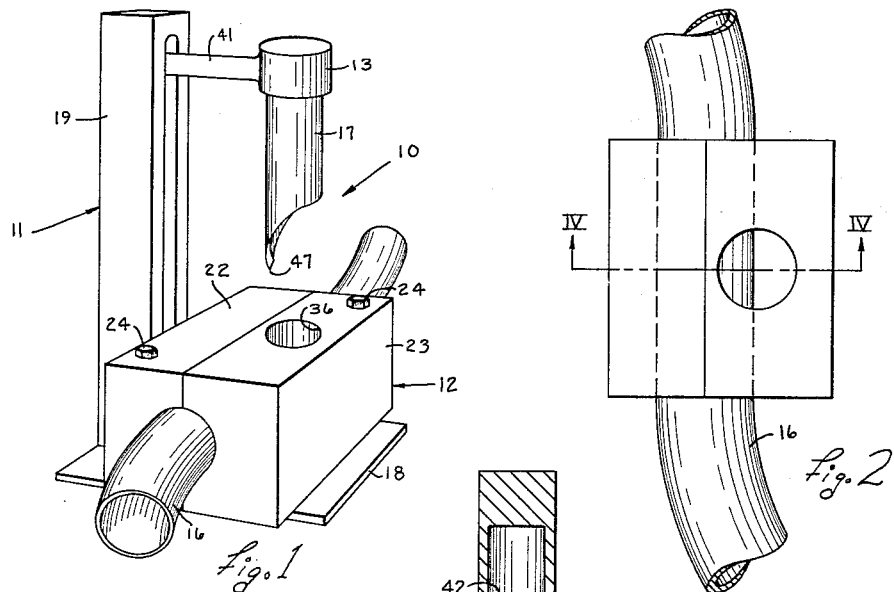
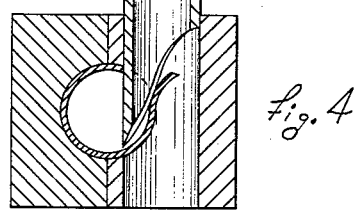
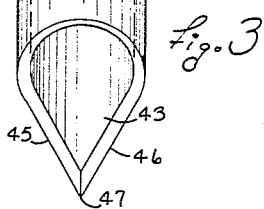
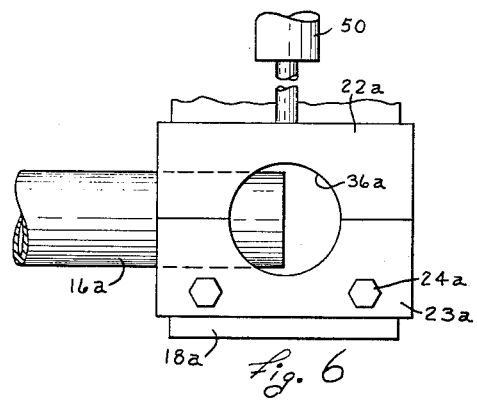
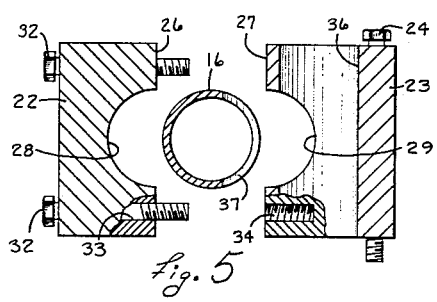
INVENTOR.
LLOYD A. KREIDER
BY
Woodhams, Blanchard and Flynn
ATTORNEYS

United States Patent Office 3,120,143
Patented Feb. 4, 1964

3,120,143
TUBE NOTCHING MACHINE
Lloyd A. Kreider, 1404 White St., P.O. Box 292,
Sturgis, Mich.
Filed Feb. 20, 1961, Ser. No. 90,533
7 Claims. (Cl. 83—454)

This invention relates in general to a machine for effecting cuts in tubular material and, more particularly, to a machine for making an arcuate cut in metallic pipes having a relatively thin wall and a substantially circular cross section.

It is often necessary in preparing pipes for use to cut an arcuate recess in the side wall or end of the pipe. For example, this need arises when one end of one pipe is being connected to another pipe between the ends thereof so that the pipes communicate with each other at their substantially T-shaped connection. Under such circumstances, it is common practice to saw or chisel an arcuate notch in the end of the one pipe and in the side of the other pipe to improve the fit. This present method and means of effecting the arcuate cuts in the pipes is slow, usually inaccurate, and often results in the breakage of the band saw and/or irreparable damage to the pipe.

Where the pipe is substantially straight, an arcuate cut can be effected by placing a die or mandrel within the pipe and then cutting the pipe with a punch. However, this procedure necessitates the availability of a great number of dies to cover all of the various pipe diameters and the various sizes and shapes of nitches. Moreover, if the pipe is curved, it is often impossible to place a mandrel inside the pipe and, furthermore, some pipes are so long as to make this procedure impractical. Therefore, a simple inexpensive procedure for notching pipes, which is presently accomplished largely by sawing, has long been sought by those faced with this problem.

Accordingly, a primary object of this invention has been the provision of a machine for cutting arcuate notches in metal pipes of irregular shapes.

A further object of this invention has been the provision of a machine, as aforesaid, whereby arcuate notches can be accurately, quickly and easily cut in a pipe without collapsing the pipe, and while, at the same time, providing a better appearing and fitting cut at lower cost and with less maintenance and repair than previously possible with existing equipment.

A further object of this invention has been the provision of a machine, as aforesaid, which is easy to operate, which is inexpensive to manufacture, and which requires a minimum of parts to produce many different cutting operations.

Other objects and purposes of this invention will become apparent to persons familiar with this type of equipment upon reading the following specification and examining the accompanying drawings, in which:

FIGURE 1 is an oblique view of a machine embodying the invention.

FIGURE 2 is a top plan view of a pipe in a pipe holding structure.

FIGURE 3 is a side elevational view of a pipe cutting tool.

FIGURE 4 is a sectional view substantially as taken along the line IV—IV of FIGURE 2 with the cutting tool in operation.

FIGURE 5 is an exploded sectional view similar to that shown in FIGURE 4 after the cut has been made in the pipe.

FIGURE 6 is a top plan view of a pipe and a pipe holding structure designed for effecting an end cut on the pipe.

For convenience in description, the terms "upper," "lower" and words of similar import will have reference to the machine of the invention as appearing in FIGURE 1. The terms "inner," "outer" and derivatives thereof will have reference to the geometric center of said machine and parts thereof.

General Description

The objects and purposes of the invention, including those set forth above, have been met by providing a machine comprised of a support structure having a gripping device for holding a pipe while it is cut or notched. The support structure includes guide means for leading a cutting tool into engagement with the pipe where the notch is to be removed therefrom. The cutting tool is a substantially cylindrical punch having a recess in one end thereof and an integral, V-shaped projection extending axially from said one end. The V-shaped projection, which is adjacent the periphery of the member, has sharpened, lengthwise edges terminating in a sharpened point for piercing the pipe. Mechanism is provided for effecting movement of the punch through the support structure and along the guide means thereof.

Detailed Construction

The machine 10 (FIGURE 1), which has been selected to illustrate a preferred embodiment of the invention, is comprised of a frame 11 upon which the pipe holder 12 is supported near the lower end thereof and upon which the tool holder 13 is movably supported near the upper end thereof. A pipe 16 is supported within the pipe holder 12 and a punch 17 is mounted within the tool holder 13.

The frame 11 includes a base plate 18 secured to the lower end of a column 19. The pipe support 12 is comprised of a pair of blocks 22 and 23 (FIGURES 1 and 5) which are supported upon the base plate 18 and may be secured thereto by means including the bolts 24. The two blocks have opposing surfaces 26 and 27 containing semicylindrical, lengthwise grooves 28 and 29, respectively, which define a cylinder having substantially the same diameter as the outside diameter of the pipe 16 held therein. The two blocks 22 and 23 may be held together by bolts 32 (FIGURE 5) which slidably extend through smooth bore openings 33 in the block 22 and are threadedly received into threaded openings 34 in the block 23. The block 23, in this particular embodiment, has a vertical, cylindrical guide opening 36 therethrough having a radius equal to the radius of curvature of the notch 37 which is desired in the pipe 16.

The tool holder 13 is secured to one end of an arm 41, the other end of which is mounted in the column 19 for vertical movement therealong by any convenient means, not shown.

The tool 17 (FIGURES 3 and 4) is, in this embodiment, a cylindrical punch having a coaxial, cylindrical recess 42 in the lower end thereof. The lower end of the punch 17 is cut substantially along a diagonal plane to provide a downwardly extending, integral and wedge-shaped cutting projection 43 having lengthwise, bevelled cutting edges 45 and 46 terminating in a sharpened point 47. It has been found that this edge configuration works particularly well wherein the angle between the plane defined by the cutting edges, as appearing in FIGURE 4, and the vertical axis of the tool is approximately 30 degrees. However, other angular relationships may be more or less effective under particular circumstances.

The bevels along the lateral edges of the projection 43 are arranged so that the sharpened edges 45 and 46 provided by said bevels are at the peripheral surface of the punch 17. The punch 17 is designed for effecting cuts which do not materially exceed a hemicircular notch. Accordingly, the bevels effecting the sharpened edges 45 and 46 need extend only slightly beyond halfway around the punch 17, the point 47 being midway between the ends of such bevelled edges. However, it will be recognized that by appropriate revision of the lower end edges of the punch 17, it is possible to punch an opening through a pipe substantially in excess of hemicircular.

*Operation*

The operation of the machine 10 which may be evident from the detailed description set forth above, is initiated by placing the pipe 16, to be cut, between the blocks 22 and 23 when they are apart (FIGURE 5). The blocks are then moved together so that the pipe 16 is snugly held within the grooves 28 and 29 in the opposing faces of the blocks 22 and 23, after which said blocks are secured to each other by the bolts 32 and mounted upon the frame 11 of the machine 10 by the bolts 24. The blocks 22 and 23 are provided with a guide opening 36 having the proper diameter and proper location with respect to the grooves 28 and 29 to provide the desired notch or cut in the pipe 16.

A tool 17, having a diameter of approximately the same size as the diameter of the guide opening 36, is mounted in the tool holder 13 and arranged so that the tip 47 thereof will engage the pipe 16 at the initial contact with said pipe by the tool 17. Moreover, said tip 47 is preferably positioned so that it engages the highest point on the tube 16 located within the cylindrical zone defined by the guide opening 36. This exact arrangement may not be necessary in all instances, but it tends to facilitate the shearing action produced by the sharpened edges 45 and 46. Thereafter, the arm 41 and tool holder 13 are moved downwardly so that the tool 17 therein is caused to move into and downwardly through the guide opening 36 (FIGURE 4), whereby a notching and shearing operation is performed.

It has been found that, by snugly embracing the pipe 16 substantially completely therearound and by providing the tool 17 with a cutting end as described above, penetration of the pipe by the tool can be effected without any material distortion in the pipe at the joint of penetration. A slight indentation may occur in the immediate vicinity of the initial penetration, but no collapsing occurs. It is believed that collapsing is avoided partially because of the shape of the cutting projection 43. However, it is also believed that any larger, initial collapsing of the tube must be accompanied, if not preceded, by an expansion of the pipe at points spaced circumferentially from the point of penetration. This is due to the fact that any inward movement of a given point on the pipe must be accompanied by a toggle action due to the convex, external surface of the pipe. However, the snug embracement provided by the blocks 22 and 23 opposes anything more than a small indentation at the point of initial contact, which indentation is more in the form of a stretching of the metal in the vicinity of such indentation than it is a collapse of the pipe.

The cutting or notching of the pipe 16 by the tool 17 can be effected in a very few seconds. The bolts 24 and 32 for connecting the blocks 22 and 23 together and to the base 18 can be replaced by quick-release, clamping devices which are capable of much faster but equally effective operation in order to speed up the removal of one pipe 16 from the pipe holder 12 and replacement therein of another pipe 16.

FIGURE 6 illustrates a pair of blocks 22a and 23a which are arranged so that the guide opening 36a therethrough is located directly over the end of the pipe 16a held between the blocks 22a and 23a. Thus, when a tool 17 is inserted into and moved downwardly through the opening 36a, the end of the pipe 16a will be sheared off in substantially the same manner as the notch 37 is sheared out of the pipe 16.

The block 23a may be rigidly secured to the base plate 18a by bolts 24a, and the block 22a may be slidably supported upon the plate 18a for movement toward and away from the block 23a. An actuating cylinder 50 may be mounted upon plate 18a and connected to block 22a for effecting the said movement thereof.

Although particular preferred embodiments of the invention have been disclosed herein for illustrative purposes, it will be understood that variations or modifications of such disclosure, which lie within the scope of the appended claims, are fully contemplated.

What is claimed is:

1. An apparatus for notching a pipe, comprising:
   holding structure for snugly embracing and gripping a portion of the exterior of said pipe in the region where the notch is to be made;
   a substantially tubular cutting tool having a substantially V-shaped, cutting edge on one axial end thereof, said cutting edge being defined by a pair of edge portions converging away from said tool to form a sharpened point at said one, axial end of said tool, said cutting edge being adjacent to, and extending a substantial distance around, the peripheral surface of said tool;
   guide means on said holding structure for slidably and snugly receiving said tubular tool and guiding the cutting edge thereof into engagement with and through a pipe held by said structure, said guide means being positioned with respect to the cutting tool and the pipe so that the sharpened point of the V-shaped cutting edge of the tool engages the pipe; and
   means for effecting an axial movement of said tool with respect to said holding structure along said guide means.

2. A device for cutting an arcuate notch through the wall of a pipe having a substantially circular cross section, comprising:
   support structure including a pair of support blocks having semicylindrical grooves in their opposing faces for snugly embracing and gripping the opposite sides of a pipe disposed within the passageway defined by said grooves;
   means defining a substantially cylindrical guide opening through said support structure, said opening communicating with the passageway defined between said semicylindrical grooves;
   a cylindrical punch having a substantially cylindrical, coaxial recess in one axial end thereof, said end having a substantially V-shaped, cutting edge defined by a pair of edge portions converging away from said punch to form a sharpened point intermediate the ends of said cutting edge, said edge portion being bevelled so that said cutting edge is adjacent to, and extends a substantial distance around, the peripheral surface of said punch, said one axial end of said punch being slidably and snugly receivable into said guide opening for engaging a pipe disposed within said passageway, and said bevelled edges substantially defining a plane disposed at an angle of about 30 degrees to the lengthwise axis of said punch, said guide opening being positioned with respect to the punch and pipe so that the sharpened point of the V-shaped cutting edge of the punch engages the pipe to perform a notching operation thereon; and
   means for effecting an axial movement of said punch through said guide opening whereby said pipe is notched.

3. In an apparatus for performing a cutting operation upon a pipe, said apparatus including a support structure, a tool holder movable toward and away from said support structure and mechanism for effecting said movement of said tool holder, the combination comprising:
   a substantially cylindrical tubular cutting tool engageable by said tool holder so that one axial end of said tool extends toward said support structure and so that said tool is moved axially by the movement of the tool holder toward and away from the support structure, said tool having a substantially V-shaped cutting edge on said axial end thereof, said cutting edge being defined by a pair of edge portions converging away from said tool holder and forming a sharpened point at said axial end of said tool, said cutting edge being adjacent to the peripheral surface of said tool;

holding means for snugly embracing and gripping a portion of the exterior surface of the pipe in the region where the cutting operation is to be performed thereon, said holding means including a pair of gripping members having opposing and engageable surfaces, said opposing surfaces having opposing grooves therein defining an opening in which said portion of said pipe is snugly held when said opposing surfaces are closely adjacent, said pipe being laterally movable into and out of both of said grooves when said opposing surfaces are separated;

means defining a guide opening through said holding means and communicating with at least one of said grooves, said guide opening having the same cross-sectional shape and area as the cross-sectional shape and area defined by said peripheral surface of said tool for slidable and snug reception of said tool into said guide opening, said guide opening being positioned with respect to said cutting tool and said pipe so that the sharpened point of the V-shaped cutting edge of the tool engages the pipe to perform a notching operation thereon.

4. In an apparatus for performing a cutting operation upon a pipe, said apparatus including a support structure, a tool holder movable toward and away from said support structure and mechanism for effecting said movement of said tool holder, the combination comprising:

a substantially cylindrical and tubular cutting tool engageable by said tool holder so that one axial end of said tool extends toward said support structure and so that said tool moves axially and nonrotatably with the tool holder toward and away from the support structure, said tool having a substantially V-shaped cutting edge on said axial end thereof, said cutting edge being defined by a pair of edge portions converging away from said tool holder and forming a sharpened point at said axial end of said tool, said cutting edge being adjacent to, and extending partially around, the peripheral surface of said tool;

holding means for snugly embracing and gripping a portion of the exterior surface of said pipe in the region where the cutting operation is to be performed thereon, said holding means having a pipe opening extending therethrough in which said pipe is snugly and removably held, said holding means including a pair of gripping members having engageable surfaces which intersect said pipe opening throughout the length thereof, whereby said pipe opening is defined by a pair of matching and opposing grooves; and means defining a guide opening in said holding means and communicating with said pipe opening, said guide opening having a cross-sectional shape and area substantially identical with the cross-sectional shape and area of the peripheral surface of said tool adjacent said one axial end thereof, whereby said tool is slidably and snugly received into said guide opening, the guide opening being positioned with respect to the cutting tool and the pipe so that the sharpened point of the V-shaped cuting edge of the tool engages the pipe to perform a notching operation thereon.

5. The apparatus of claim 4 wherein said guide opening extends through, and is located in only one of said gripping members; and wherein said pipe opening is of circular cross section, said engageable surfaces are substantially planar and the center line of said pipe is disposed within the plane defined by said engageable surfaces when said portion of the pipe is in the pipe opening.

6. The apparatus of claim 4 wherein said guide opening extends through parts of said gripping members; and wherein said engageable surfaces, when they are engaged, define a plane substantially including the center line of the portion of the pipe disposed in the pipe opening.

7. In an apparatus for performing a cutting operation upon a pipe having a circular cross section, said apparatus including holding structure for snugly embracing and gripping a portion of said pipe in the region where the cutting operation is to be performed and guide means in said holding means for guiding a tool into engagement with said pipe, and a tool holder supported for movement toward and away from said holding structure along a line passing through said guide means, tool means cooperable with said holding means for effecting the cutting operation, comprising:

an elongated, cylindrical member having a concentric, cylindrical recess in one axial end thereof, the other axial end of said member being engageable by said tool holder for nonrotatable movement thereby in an axial direction toward and away from the holding structure, said cylindrical member having a V-shaped cutting edge on said one axial end thereof, said cutting edge being defined by a pair of edge portions converging away from said other axial end of said member to form a sharpened point remote from said other axial end of said member, said cutting edge being adjacent to the peripheral surface of said cylindrical member and extending approximately halfway around said peripheral surface, each of said pair of edge portions being at least approximately equal in length to the diameter of said cylindrical member; the guide means being positioned with respect to said cylindrical member and the pipe so that the sharpened point of the V-shaped cuting edge of the cylindrical member engages the pipe to perform a cutting operation upon the pipe.

References Cited in the file of this patent

UNITED STATES PATENTS

| | | |
|---|---|---|
| 1,230,319 | Paulson | June 19, 1917 |
| 1,513,100 | Frederick | Oct. 28, 1924 |
| 2,064,539 | Hart | Dec. 15, 1936 |
| 2,137,620 | Meissner | Nov. 22, 1938 |
| 2,243,614 | Vogel | May 27, 1941 |
| 2,361,595 | Broersma | Oct. 31, 1944 |
| 2,620,030 | Anderson | Dec. 2, 1952 |
| 2,639,500 | Gillespie | May 26, 1953 |
| 2,908,328 | Robertson | Oct. 13, 1959 |
| 3,005,369 | Koster | Oct. 24, 1961 |
| 3,065,657 | Thompson | Nov. 27, 1962 |